United States Patent [19]

Wurzburg et al.

[11] 4,432,089
[45] Feb. 14, 1984

[54] DIGITAL LOOP TRANSCEIVER FOR INTERFACING A DIGITAL PABX TO A DIGITAL SUBSCRIBER SET VIA A SUBSCRIBER LINE

[75] Inventors: Henry Wurzburg, Round Rock; Stephen H. Kelley, Austin, both of Tex.

[73] Assignee: Motorola, Inc., Schaumburg, Ill.

[21] Appl. No.: 334,412

[22] Filed: Dec. 24, 1981

[51] Int. Cl.³ .......................... H04J 3/00; H04M 9/06
[52] U.S. Cl. .................................... 370/110.1; 370/29; 179/18 AD
[58] Field of Search ....................... 370/24, 29, 110.1; 179/18 AD, 99 M; 370/77

[56] References Cited

U.S. PATENT DOCUMENTS 3,924,077 12/1975 Blakeslee .............................. 370/29
3,978,290 8/1976 Sarma ............................ 179/18 AD
4,145,574 3/1979 Wintzer ................................ 370/29
4,281,410 7/1981 Agricola et al. ................. 370/110.1

OTHER PUBLICATIONS

International Conference on Communications, IEEE, Jun. 1980, Desikan and Warner, "A Data Switching Technique for a Digital PABX".

Primary Examiner—Gerald L. Brigance
Attorney, Agent, or Firm—Anthony J. Sarli, Jr.; Jeffrey Van Myers; Robert L. King

[57] ABSTRACT

In a digital telephone system, a digital private automatic branch exchange (PABX) has a plurality of digital line cards for coupling the PABX to respective digital subscriber sets via subscriber lines. In each digital line card, a digital loop transceiver operates in a master mode to couple the digital data bus of the PABX to the subscriber line via a subscriber line interface circuit in response to control signals provided by the PABX on the control bus thereof. In each digital subscriber set, a digital loop transceiver operates in a slave mode to couple the subscriber set to the subscriber line via a subscriber line interface circuit and to provide the several control signals required by the other components thereof. The digital loop transceivers provide communication on each of two communication channels, with the digital data words of the first channel being treated the same as the digital data words of the second channel.

18 Claims, 9 Drawing Figures

Fig. 2 — PRIOR ART —

ANALOG LINE CARD

BASIC DIGITAL SUBSCRIBER SET

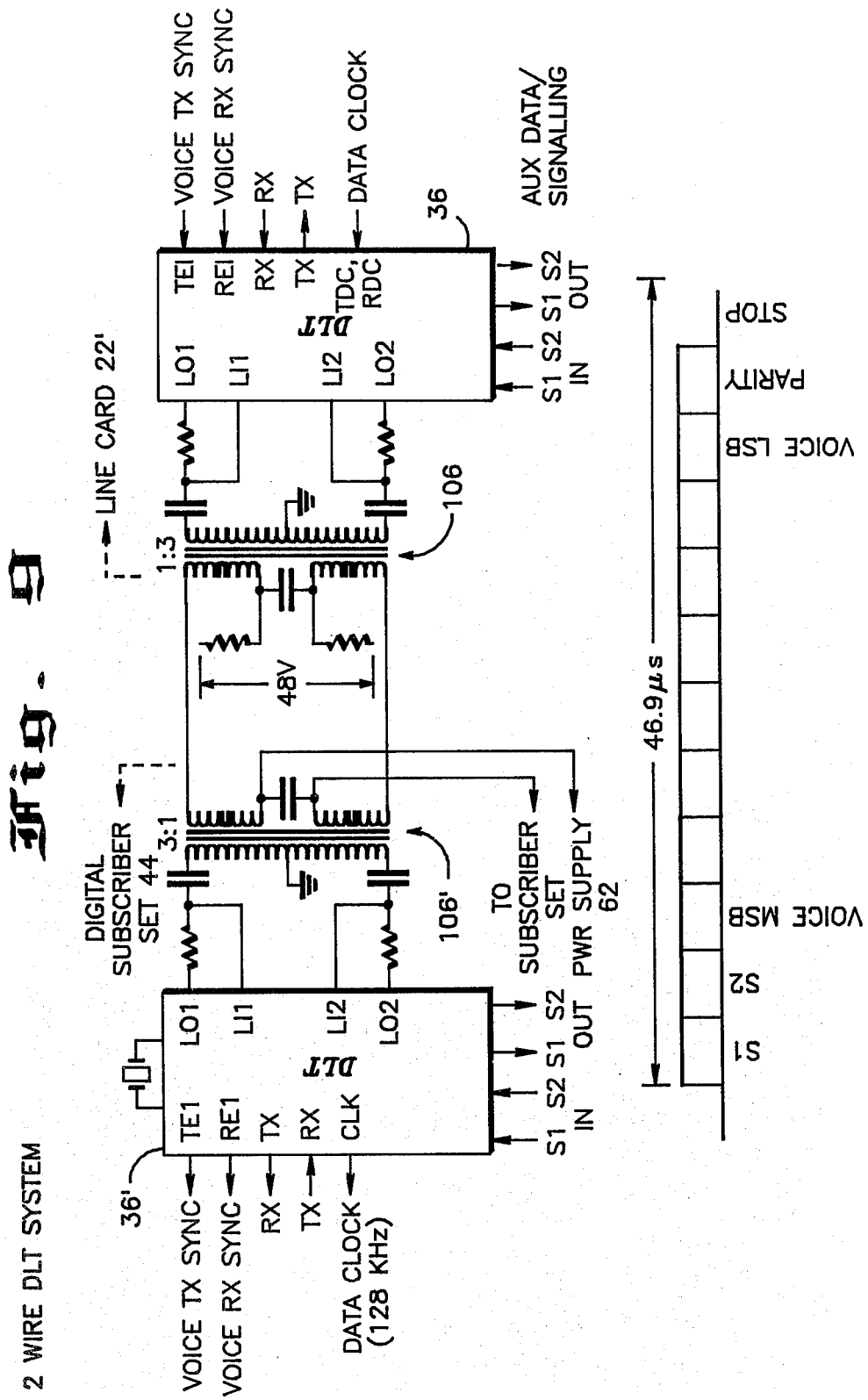

DIGITAL LOOP TRANSCEIVER FOR INTERFACING A DIGITAL PABX TO A DIGITAL SUBSCRIBER SET VIA A SUBSCRIBER LINE

TECHNICAL FIELD

This invention relates generally to digital telephone systems and, more particularly, to a digital loop transceiver for use in a digital telephone system comprising a digital PABX and a plurality of digital subscriber sets.

BACKGROUND ART

When a voice call is made using a conventional analog subscriber set, only a small portion of the frequency spectrum available on the typical subscriber line is utilized. During the development of distributed data processing systems, an effort was made to utilize the existing subscriber line network to facilitate communication of the digital data used by such systems. Various types of modulator/demodulator (modem) devices have been developed to take advantage of the latent capability of the subscriber line network to support digital data communication at data rates significantly greater than that required for analog voice communication. For example, synchronous modems are commercially available which utilize the differential phase shift keyed (DPSK) modulation/demodulation technique to provide data communication at rates up to 9600 baud. However, even in the digital private automatic branch exchanges (PABX's) which support intra-exchange communication of voice information in the form of digital PCM voice data words, the response characteristics of the several analog components of the typical analog line card used therein generally prevent reliable communication at higher rates.

Several techniques have been proposed for providing higher speed digital data communication between subscribers through such PABX's. However, such proposals typically require the installation of additional pairs of subscriber lines to subscribers requiring the service and/or redesign/modification of the particular PABX to provide the capability to process the pure digital data words in a manner different from the digital PCM voice data words.

SUMMARY OF THE INVENTION

Accordingly, it is an object of the present invention to enable digital data words to be communicated at significantly higher speeds over the existing, installed base of subscriber lines, without any redesign or modification whatsoever of the conventional digital PABX.

In accordance with the present invention, the analog to digital conversion function required to support voice communication in the digital PABX is transferred from the PABX to the subscriber set itself, by moving the conventional codec/filter from the analog line card to the subscriber set, and by interfacing the codec/filter and the PABX to the subscriber line via a pair of digital loop transceivers (DLT) constructed in accordance with the present invention. The existing subscriber line is then converted from the typical, relatively low speed analog link into a high speed data link by providing, at both the subscriber and exchange ends, a subscriber line interface network which is responsive to the much higher frequencies, e.g. up to about 256 kHz, otherwise unavailable on the typical subscriber line.

Once the subscriber set has been converted into a digital form and the existing subscriber line upgraded to a high speed data link in accordance with the present invention, the digital PCM voice data words and associated signalling information for a single voice call will require only about half of the bandwidth available on the subscriber line. Accordingly, the preferred form of the DLT of the present invention simultaneously supports a second communication channel, with the digital data words and associated signalling information of the second channel being time multiplexed with the digital data words and signalling information of the first channel. However, as far as the DLT is concerned, neither, either or both of these channels may carry PCM voice data words, depending upon the requirements of a given subscriber.

BRIEF DESCRIPTION OF THE DRAWINGS

FIG. 9 is a schematic representation of a 2-wire communication system between the DLT in the digital line card of FIG. 3 and the DLT in the digital subscriber set of FIG. 4.

DESCRIPTION OF THE PREFERRED EMBODIMENT

Figure 1:
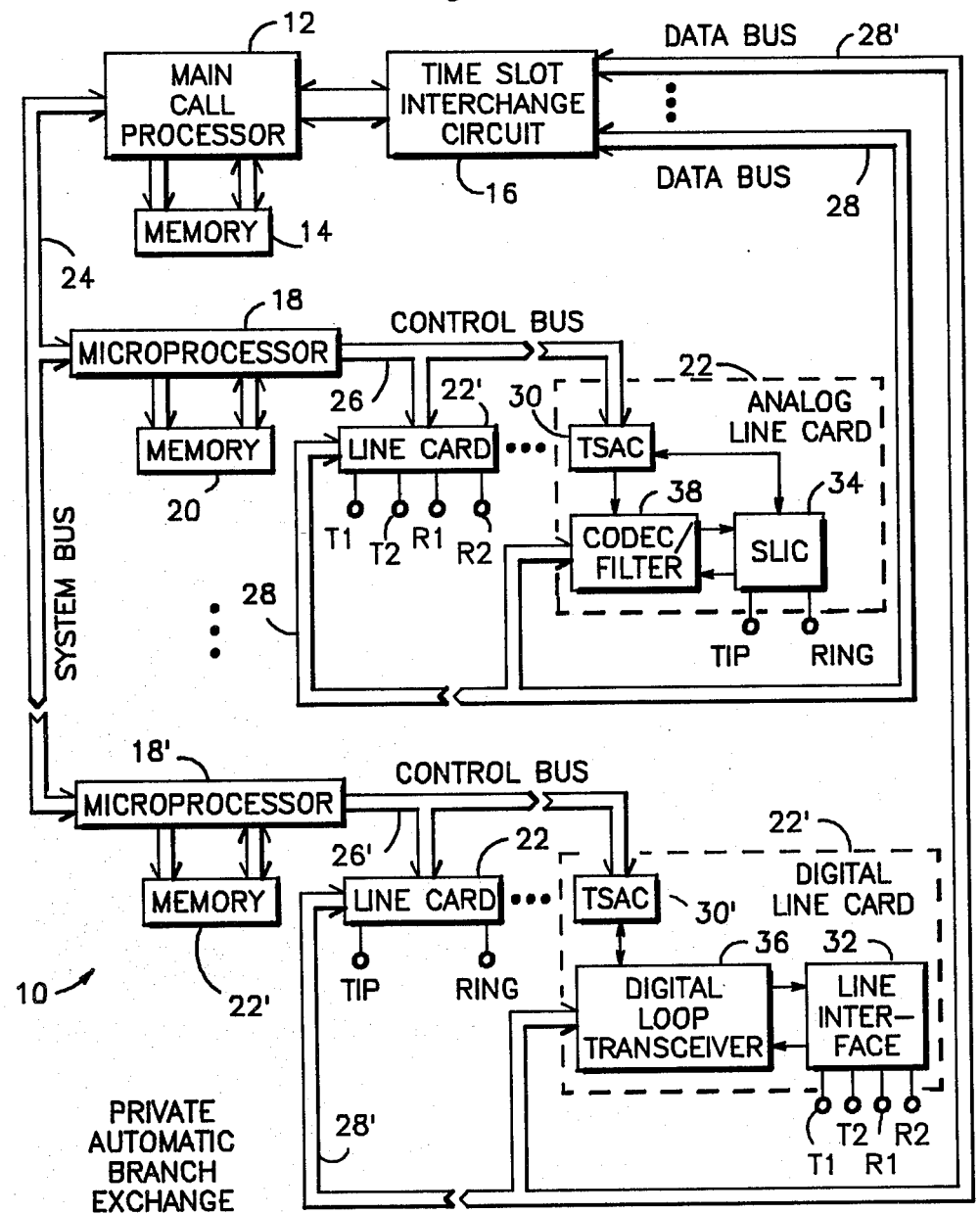
FIG. 1 is a block representation of a private automatic branch exchange (PABX) adapted in accordance with the present invention.

Shown in FIG. 1 is a conventional private automatic branch exchange (PABX) 10 comprised generally of a main call processor 12 having associated memory 14, a time slot interchange circuit 16, a set of call processing microprocessors 18—18', each having an associated memory 20—20', and a plurality of conventional analog line cards 22. In the illustrated form, the PABX 10 also includes at least two digital line cards 22' constructed in accordance with the present invention.

In a typical digital telephone switching systms such as the PABX 10, the main call processor 12 coordinates, via a system bus 24, the call processing activities of each of the several call processing microprocessors 18—18'. In turn, each of the call processing microprocessors 18—18' controls, via respective control buses 26—26', the communication of digital PCM voice data words via respective data buses 28—28' between the several line cards 22 assigned to such microprocessor 18—18'.

Figure 2:
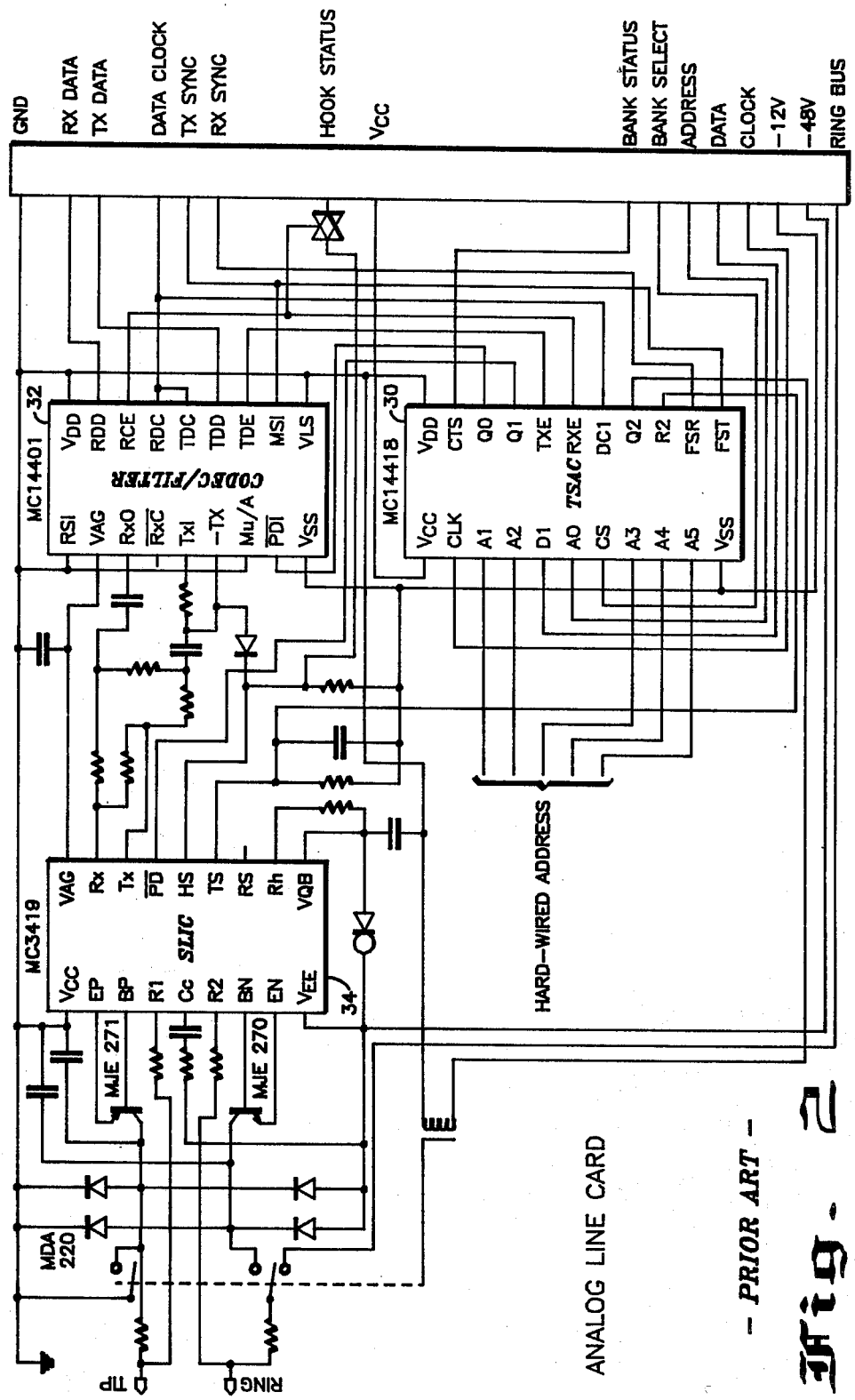
FIG. 2 is a schematic diagram of an analog line card for use in the PABX of FIG. 1.

In general, each of the analog line cards 22 comprises a time slot assignment and control circuit (TSAC) 30 for selectively enabling a codec/filter 32 to digitally encode an analog voice input signal received via a subscriber line interface circuit (SLIC) 34 from a conventional single channel subscriber set (not shown) coupled to tip and ring conductors for output as a digital pulse code modulation (PCM) voice data word on the respective data bus 28—28', and to decode a digital PCM voice data word received on the data bus 28—28' for output as an analog voice output signal to the subscriber set (not shown) via the SLIC 34. Shown in FIG. 2 is a circuit schematic for such a conventional analog line card 22, using components commercially available from Motorola. The various control and data signals which are provided to or by the line card 22 are generally referred to as the "backplane" of the PABX 10.

In a typical telephone call initiated by a subscriber served by a "source" line card 22 controlled by, say, the call processing microprocessor 18 to a subscriber served by a "destination" line card 22 controlled by, for example, the call processing microprocessor 18', the TSAC 30 on the source line card 22 initially detects via the associated SLIC 334 that the source subscriber set is off hook, and routes the call routing information to the call processing microprocessor 18 for transfer to the main call processor 12. If the destination line card 22 is not indicated in the memory 14 as being busy, the main call processor 12 then requests the call processing microprocessor 18' to notify the destination line card 22 of the call. If, upon providing the system-generated ring signal to the destination subscriber set via the respective SLIC 34, the associated TSAC 30 advises the call processor 18' that the destination subscriber set has been taken off hook, the call processing microprocessor 18' advises the main call processor 12 that the requested connection has been established. During a particular transmit time slot assigned by the main call processor 12, the TSAC 30 on the source line card 22 enables the associated codec/filter 32 to encode the analog voice signal then being received from the source subscriber set via the SLIC 34 for output as a digital PCM voice data word onto the data bus 28. Meanwhile, the main call processor 12 has enabled the time slot interchange circuit 16 to couple the data bus 28 to the data bus 28' to facilitate the requested intra-exchange communication of the digital PCM voice data word. Simultaneously, the TSAC 30 on the destination line card 22 enables the associated codec/filter 32 to decode the digital PCM voice data word on the data bus 28' for output as an analog voice signal to the destination subscriber set via the SLIC 34. In a similar manner, but during a different receive time slot assigned by the main call processor 12, the destination line card 22 is allowed to encode the analog voice signal received from the destination subscriber set for transmission as a digital PCM voice data word via data bus 28', interchange circuit 16 and data bus 28 to the source line card 22 for decoding and output to the source subscriber set. If this exchange of digital PCM voice data words occurs at a sufficiently high frame rate, say of the order of 8 kHz, then it will appear to each of the subscribers that there is a direct analog link between their respective subscriber sets.

Figure 3:
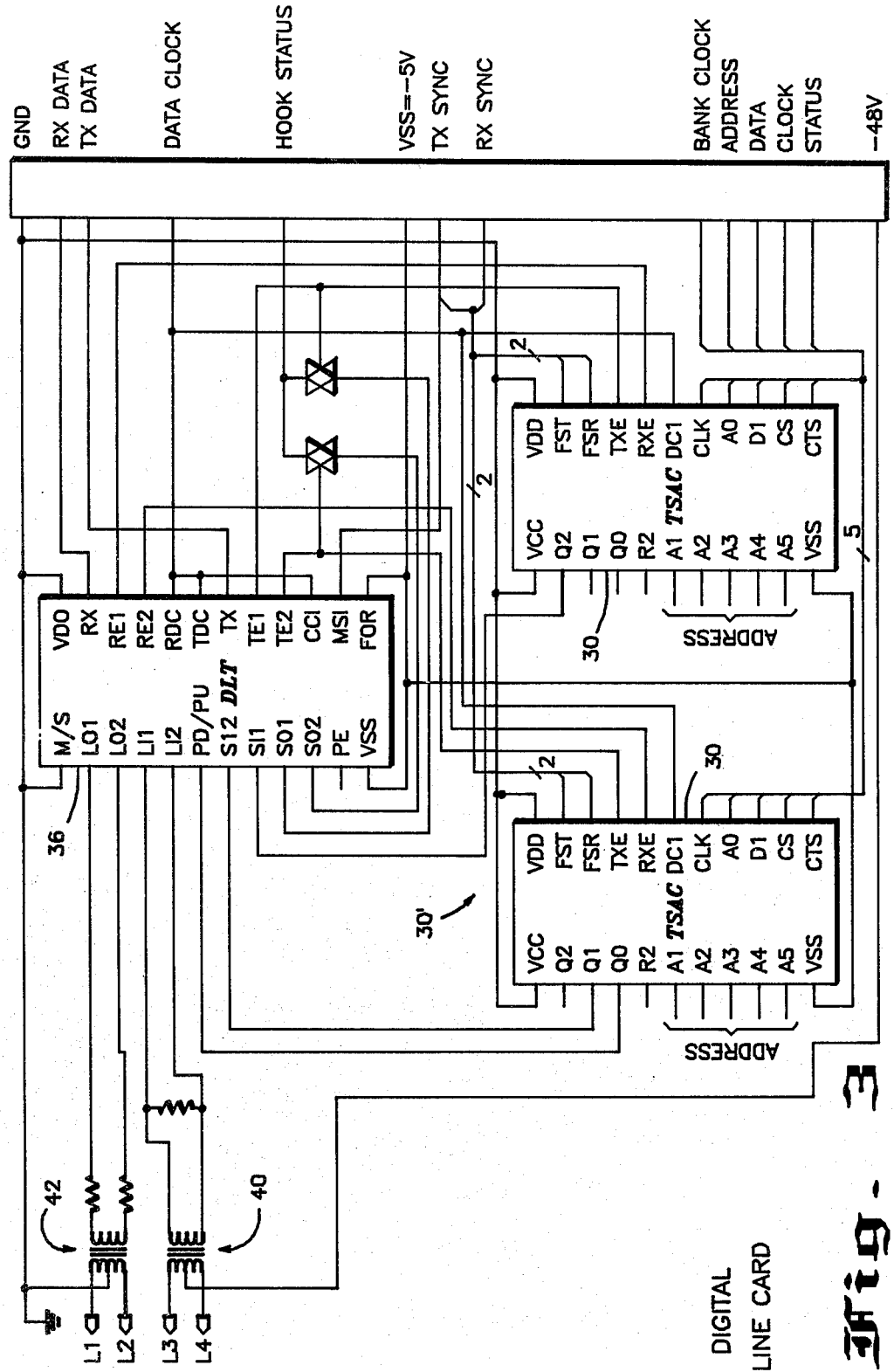
FIG. 3 is a digital line card constructed in accordance with the present invention for use in the PABX of FIG. 1.
Figure 4:
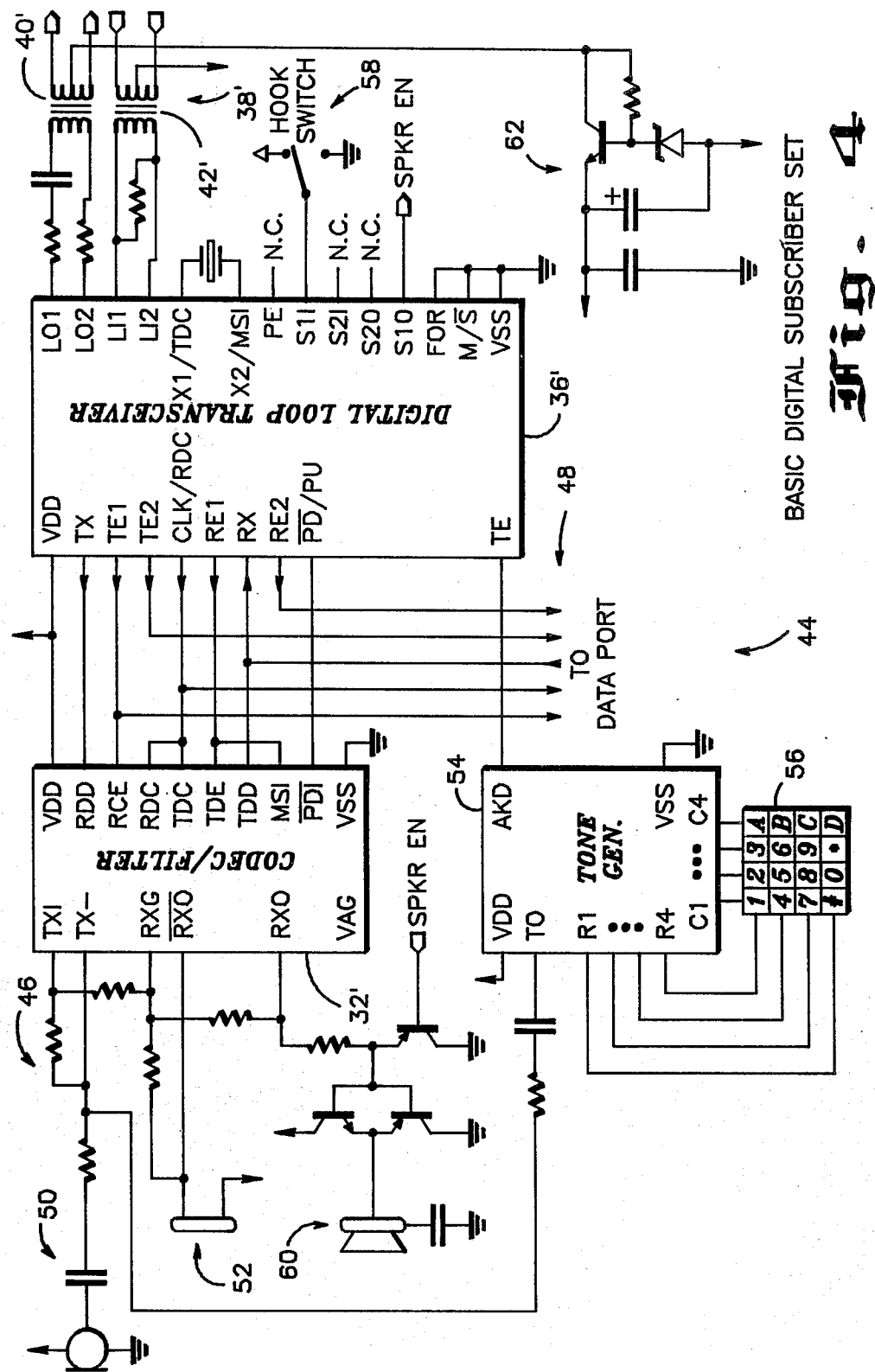
FIG. 4 is a digital subscriber set constructed in accordance with the present invention to communicate over a subscriber line with the digital line card of FIG. 3.

In the general form shown in FIG. 1, each of the digital line cards 22' comprises a time slot assignment and control circuit (TSAC) 30' for selectively enabling a digital loop transceiver (DLT) 36 (see FIG. 5) to receive digital data words via a subscriber line interface network 38 from a dual channel, digital subscriber set, such as that shown in FIG. 4, which is coupled to respective receive and transmit pairs of tip and ring conductors, for direct output on the respective data bus 28—28' in the same manner as the digital PCM voice data words are output by the codec/filter 32 in the analog line cards 22; and to receive digital data words on the data bus 28—28' for direct output to the subscriber set via the subscriber line interface network 38. Shown in FIG. 3 is a circuit schematic for the digital line card 22', wherein: the TSAC 30' comprises a pair of the Motorola time slot assignment circuits (TSAC's), one for each of the two digital communication channels the digital line card 22' is capable of simultaneously supporting; the DLT 36 comprises an integrated circuit constructed in accordance with FIG. 5; and the subscriber line interface network 38 comprises a transmit isolation transformer 40 coupled to the tip and ring conductors which comprise the receive pair of the subscriber line and a receive isolation transformer 42 coupled to the tip and ring conductors which comprise the transmit pair of the subscriber line. As illustrated in FIG. 3, the digital line card 22' responds to and provides the same control and data signals which are provided to or by the analog line card 22 via the backplane of the PABX 10.

Shown in FIG. 4 is a dual channel, digital subscriber set 44 constructed in accordance with the present invention. In general, the subscriber set 44 comprises a digital loop transceiver (DLT) 36' (see FIG. 5) for receiving digital data words from the digital line card 22' (see FIG. 3) via a subscriber line interface network 38' coupled to respective receive and transmit pairs of tip and ring conductors, for output, if digital PCM voice data words, to a conventional codec/filter 32' for subsequent decoding and output as an analog voice output via a voice I/O network 46, or, if digital data words, to a subscriber data processor (not shown) via a data port 48; and for transmitting digital data words provided either by the codec/filter 32' in the form of digital PCM voice data words or by the subscriber data processor in the form of digital data words, to the digital line card 22' via the subscriber line interface network 38'. In the preferred form, the voice I/O network 46 includes a voice input portion 50, and a voice output portion 52; the DLT 36' comprises an integrated circuit constructed in accordance with FIG. 5; and the subscriber line interface network 38' comprises a transmit isolation transformer 40' coupled to the tip and ring conductors which comprise the transmit pair of the subscriber line and a receive isolation transformer 42' coupled to the tip and ring conductors which comprise the receive pair of the subscriber line. In the illustrated form, a conventional tone generator 54, such as the Mostek MK5087, interacts with a dial keypad 56 and the voice I/O network 46 to provide the call routing information required to establish each of the two communication channels, while a conventional hook switch 58 provides call initiation signalling information of the DLT 36'. An audible indication of an incoming call is provided via a ringing transducer 60. A subscriber set power supply 62 derives operating power for the several components of the subscriber set 44 from the subscriber line in a conventional manner.

Figure 5:
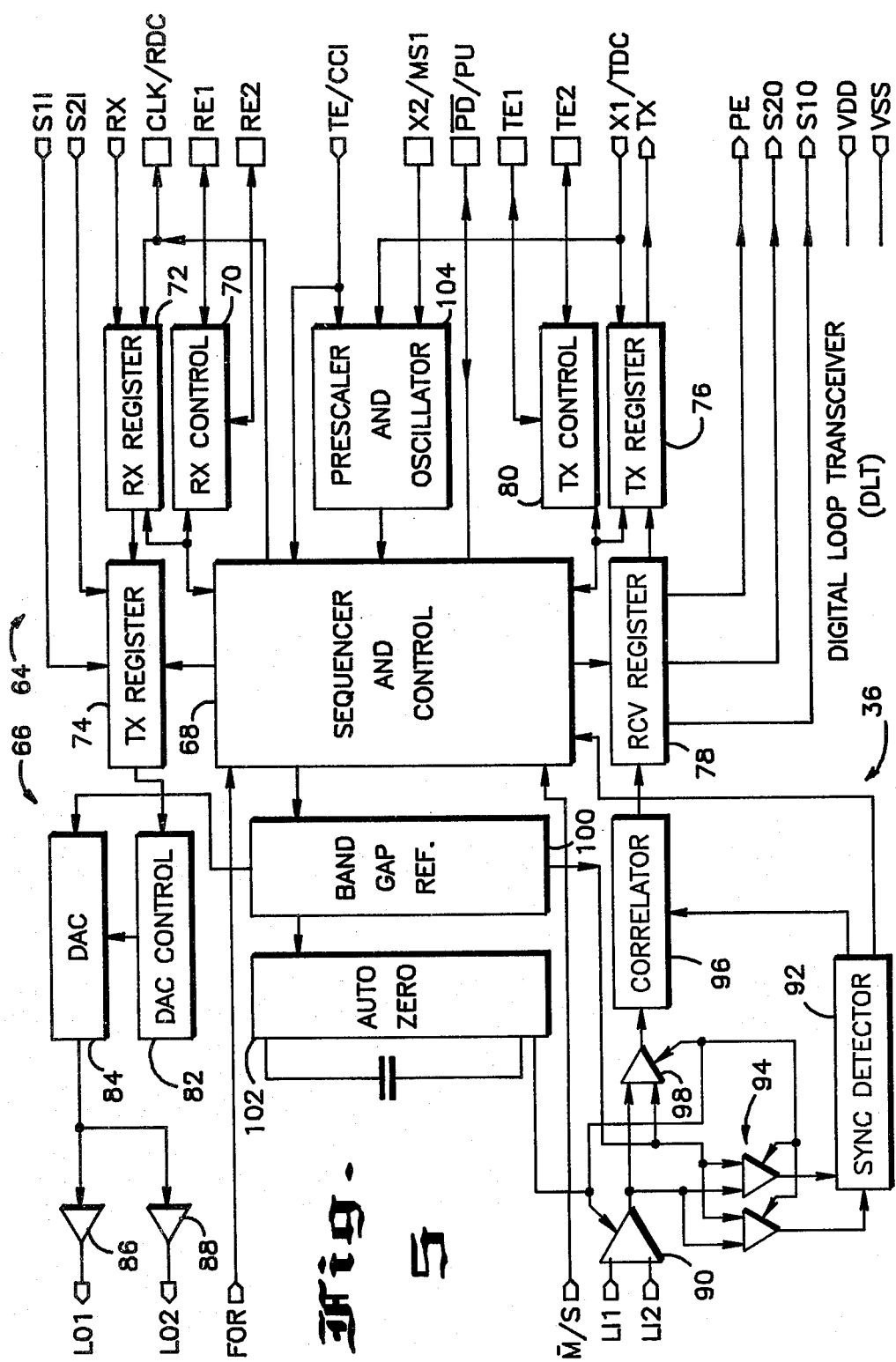
FIG. 5 is a digital loop transceiver (DLT) constructed in accordance with the present invention for use in the digital line card of FIG. 3 and the digital subscriber set of FIG. 4.

Shown in FIG. 5 is a block diagram of the digital loop transceiver (DLT) 36, constructed in accordance with the present invention. In general, the DLT 36 comprises a digital interface portion 64 for interfacing with the PABX 10 in a master operating mode and with the codec/filter 32 and subscriber data processor in a slave operating mode, a modulator/demodulator portion 66 for transmitting and receiving digital data words via the subscriber line, and a sequencer and control portion 68 for controlling the sequence of operations performed by the digital interface and modulator/demodulator portions 64 and 66, respectively.

In the digital interface portion 64, a receive (RX) control circuit 70 responds to either of two channel receive enable signals, RE1 and RE2, by enabling a receive (RX) register 72 of the shift register type to serially receive digital data bits via a receive (RX) terminal in synchronization with a receive data clock (RDC) on a CLK/RDC terminal. When a predetermined "frame" of data (see discussion below) has been received, the sequencer and control portion 68 enables the RX register 72 to transfer the "transmit" frame of data in parallel into a transmitter (XMIT) register 74 in the modulator/demodulator portion 66. Simultaneously, the then-current states of the two channel signalling bits on respective S1I and S2I terminals are latched and inserted into the frame of data in the XMIT register 74. Substantially independently, the sequencer and control portion 68 enables a transmit (TX) register 76 to receive a "receive" frame of data in parallel from a receiver (RCV) register 78 in the modulator/demodulator portion 66. Simultaneously, the two channel signalling bits in the receive frame of data are latched and output on respective S1O and S2O terminals. In response to either of two channel transmit enable signals, TE1 and TE2, a transmit (TX) control circuit 80 enables the TX register 76 to serially transmit the receive frame of data via a TX terminal in synchronization with a transmit data clock (TDC) on an X1/TDC terminal.

In the modulator/demodulator portion 66, a digital to analog converter (DAC) control circuit 82 periodically enables a digital to analog converter (DAC) 84 to transmit the transmit frame of data in the XMIT register 74 to the transmit transformer 40 in the subscriber line interface network 38 using a differential pair of output drivers 86 and 88 coupled to respective line output terminals LO1 and LO2. In the preferred embodiment, the DAC 84 utilizes a burst differential phase shift keyed (DPSK) modulation technique at a carrier frequency of 256 kHz. Substantially independently, an input buffer 90 of the differential to single ended output type in the modulation/demodulation portion 66 couples the signal received from the receive transformer 42 in the subscriber line interface network 38 via line input terminals LI1 and LI2 to a sync detector 92 via a window detector 94 and to a correlator 96 via a comparator 98. As phase shifts of the proper form are decoded by the correlator 96, the "decoded" bits are shifted into a shift register portion thereof which maintains the most recently received set of data bits which might constitute a frame. When the energy of a DPSK signal of the proper frame length is detected, the sync detector 92 provides a valid sync signal to enable the correlator 96 to transfer the receive frame of data bits being maintained therein, in parallel to the RCV register 78. A demodulator having a sync detector and correlator of suitable form is shown and described in copending U.S. patent application Ser. No. 332,408. A switched capacitor bandgap reference 100 similar to that shown and described in copending U.S. patent application Ser. No. 231,073, now U.S. Pat. No. 4,375,595, provides a precision reference voltage to the DAC 84, the window detector 94, and the comparator 98. Periodically, the offsets of the input buffer 90, the window detector 94, the comparator 98, and the bandgap reference 100 are zeroed by an auto-zero circuit 102 in a manner similar to that shown and described in copending U.S. patent application Ser. No. 231,079, now U.S. Pat. No. 4,355,285.

In operation, the DLT 36 provides duplex communication of digital data words on a pair of independent channels and a signalling bit associated with each of the channels, between the duplex subscriber line and a digital data port. In a typical line transmission operation, the RX register 72 successively receives a digital data word for each of the channels in synchronization with the receive data clock, with the digital data word for the first of the channels being received from the digital I/O port via the RX terminal in response to the first of the channel receive enable signals, RE1, and the digital data word for the second of the channels being received from the digital I/O port via the RX terminal in response to the second of the channel receive enable signals, RE2. After the last data bit of the frame has been clocked into the RX register 72, both data words are transferred to the XMIT register 74, and the then-current states of the respective channel signalling bits on the S1I and S2I terminals added to complete the frame. As soon as the frame has been assembled, the DAC control circuit 82 actuates the DAC 84 to serially modulate the first and second digital data words and the respective channel signalling bits in the frame, for transmission via the transmit transformer 40 to one of the pairs of wires in the subscriber line.

In a typical line reception operation, the sync detector 92 monitors the signal received via the receive transformer 42 on the other pair of wires in the subscriber line, and provides a valid sync signal in response to detecting the energy of a DPSK modulated signal of the proper frame length. Meanwhile, the correlator 96 has been serially demodulating the sequentially received bits which might constitute a frame containing a digital data word for each of the channels and the respective channel signalling bits. In response to the valid sync signal, indicating that a valid frame has indeed been received, the correlator 96 transfers the frame to the RCVR register 78. At an appropriate time depending upon the mode of operation, the frame is then transferred from the RCVR register 78 to the TX register 76 and the respective channel signalling bits latched for output on the S1O and S2O terminals. The TX register 76 then sequentially transmits the digital data words in synchronization with the transmit data clock, with the digital word for the first channel being transmitted to the digital I/O port via the TX terminal in response to the first of the channel transmit enable signals, TE1, and the digital data word for the second channel being transmitted to the digital I/O port via the TX terminal in response to the second of the channel transmit enable signals, TE2.

Figure 6:
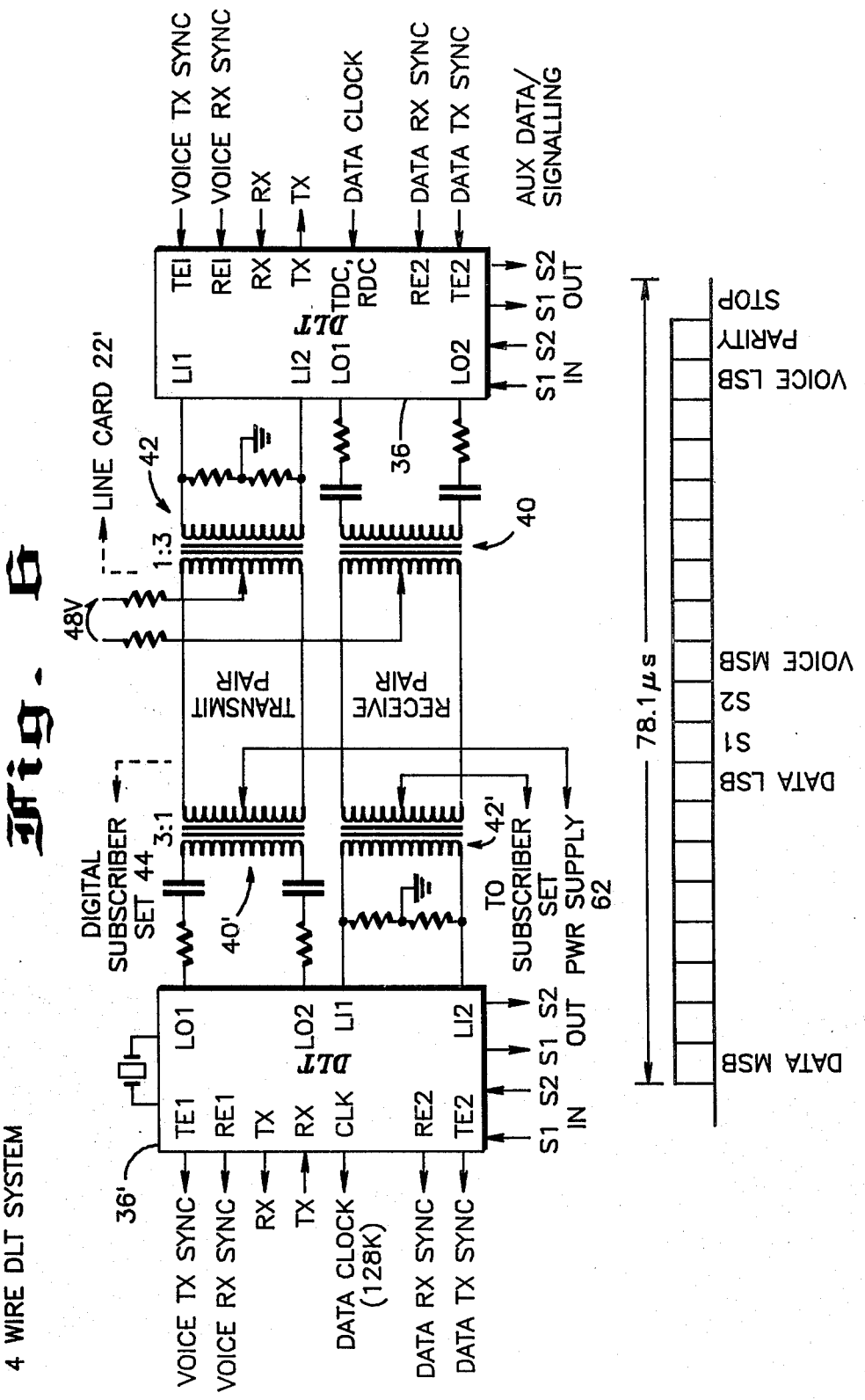
FIG. 6 is a schematic representation of a 4-wire communicaion system between the DLT in the digital line card of FIG. 3 and the DLT in the digital subscriber set of FIG. 4.

Shown in FIG. 6 is a schematic representation of a 4-wire or duplex subscriber line which has been coupled at the exchange end thereof to the DLT 36 in the digital line card 22' via the transmit and receive transformers 40 and 42, respectively, and at the subscriber end thereof to the DLT 36' in the digital subscriber set 44 via the transmit and receive transformers 40' and 42', respectively. In the dual-channel form of the duplex system, a frame of data comprises an 8-bit digital data word for the first channel, an 8-bit digital data word for the second channel, and the signalling bits for the first and second channels. Preferably, the frame also includes a parity bit, either even or odd, as desired. A suitable frame format is illustrated in FIG. 6.

In the digital line card 22' shown in FIG. 3, the DLT 36 is placed in the master mode of operation by a logic high signal on a master/slave (M/S) terminal. In the master mode, the DLT 36 emulates the codec/filter 32 with respect to the backplane by receiving/transmitting the digital data words just like the codec/filter 32, and by responding to the various control signals just like the codec filter 32. In particular, the RX register 72 shown in FIG. 5 successively receives a digital data word for each of the channels in synchronizaion with the data clock provided by the PABX 10 via the backplane, with the data word for the first channel being received from the backplane via the RX terminal in response to the RE1 signal provided by a respective one of the TSAC's 30 during the receive time slot assigned to the first channel, and the data word for the second channel being received from the backplane via the RX terminal in response to the RE2 signal provided by the other TSAC 30 during the receive time slot assigned to the second channel. In response to the next master sync input (MSI) received via an X2/MSI terminal after the last data bit of the frame has been clocked into the RX register 72, both digital data words are transferred to the XMIT register 74, and the then-current states of the respective channel signalling bits provided via the S1I and S2I terminals by the TSAC's 30, respectively, added to complete the frame. As soon as the frame has been assembled, the DAC control circuit 82 actuates the DAC 84 to serially modulate the first and second digital data words and the respective channel signalling bits in the frame, for transmission via the transmit transformer 40 to the receive pair of wires in the subscriber line.

Figure 7:
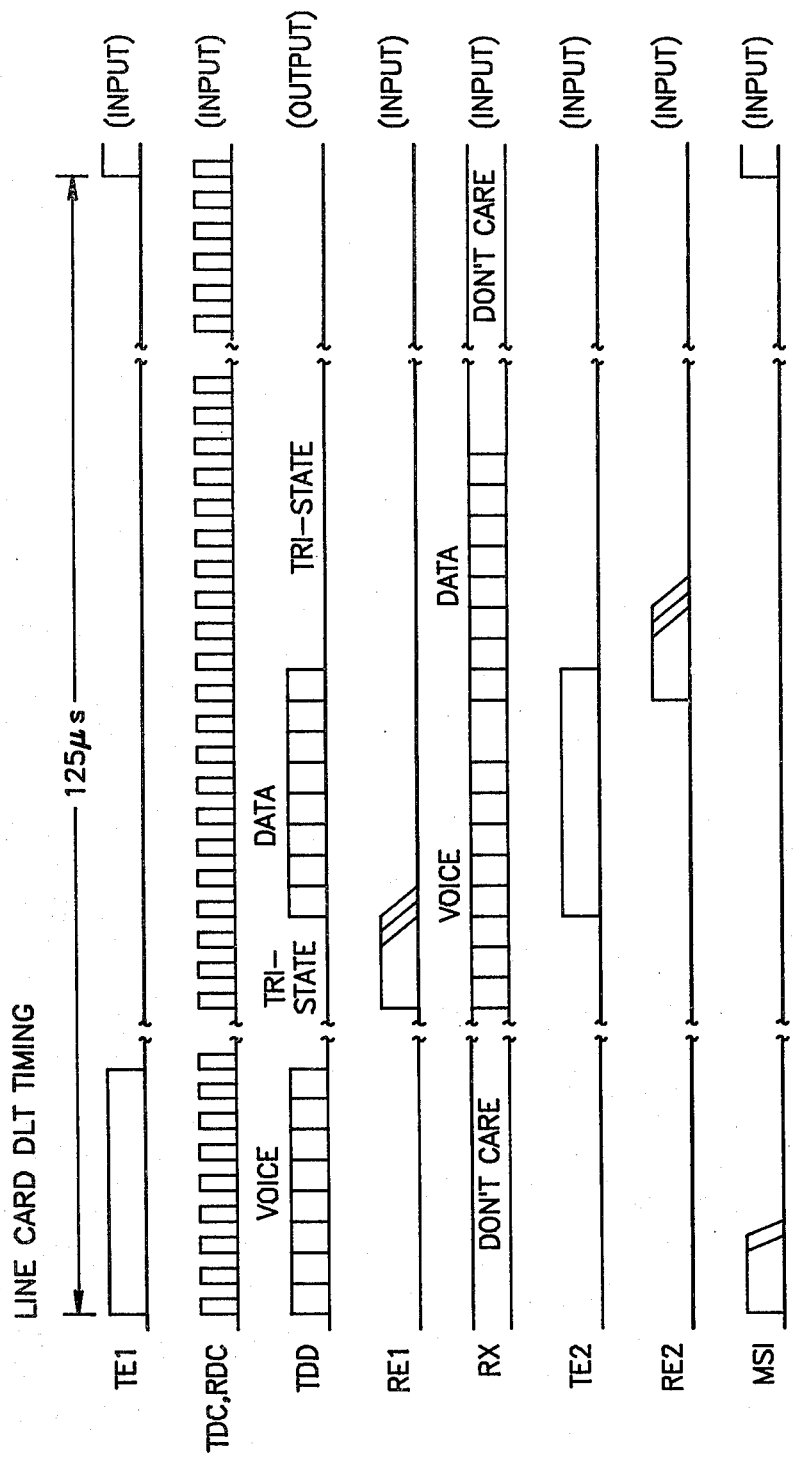
FIG. 7 is a timing diagram illustrating a typical exchange between the DLT in the digital line card of FIG. 3 and the PABX of FIG. 1.

Simultaneously, the sync detector 92 monitors the signal received via the receive transformer 42 on the transmit pair of wires in the subscriber line, and provides the valid sync signal in response to detecting the energy of a DPSK modulated signal of the proper frame length. Meanwhile, the correlator 96 has been serially demodulating the sequentially received bits which might constitute a frame containing a digital data word for each of the channels and the respective channel signalling bits. In response to the valid sync signal, indicating that a valid frame has indeed been received, the correlator 96 transfers the frame to the RCVR register 78. In response to the next MSI, the frame is then transferred from the RCVR register 78 to the TX register 76 and the respective channel signalling bits latched for output on the S1O and S2O terminals. The TX register 76 then sequentially transmits the digital data words in synchronization with the transmit data clock provided by the PABX 10 via the backplane, with the digital data word for the first channel being transmitted to the backplane via the TX terminal in response to the TE1 signal provided by the first one of the TSAC's 30 during the transmit time slot assigned to the first channel, and the digital data word for the second data channel being transmitted to the backplane via the TX terminal in response to the TE2 signal provided by the other TSAC 30 during the transmit time slot assigned to the second channel. A typical sequential interaction of the DLT 36 with the TSAC's 30, and with the PABX 10 is illustrated by way of example in the timing diagram of FIG. 7.

In the subscriber set 44 shown in FIG. 4, the DLT 36' is placed in the slave mode of operation by a logic low on the master/slave (M/S) terminal. In the slave mode, the DLT 36' emulates the functions of the TSAC 30 and the backplane with respect to the codec/filter 32' by providing the digital PCM voice data words and control signals necessary for the codec/filter 32' to operate, and by receiving the digital PCM voice data words provided by the codec/filter 32' just like the backplane. In this mode, the sync detector 92 monitors the signal received via the receive transformer 42' on the receive pair of wires in the subscriber line, and provides the valid sync signal in response to detecting the energy of a DPSK modulated signal of the proper frame length. Meanwhile, the correlator 96 has been serially demodulating the sequentially received bits which might constitute a frame containing a digital data word for each of the channels and the respective channel signalling bits. In response to the valid sync signal, indicating that a valid frame has indeed been received, the correlator 96 transfers the frame to the RCVR register 78. The frame is then promptly transferred from the RCVR register 78 to the TX register 76 and the respective channel signalling bits latched for output on the S1O and S2O terminals. The TX register 76 then sequentially transmits the digital data words in synchronization with a transmit data clock generated by a prescaler and oscillator 104 using a crystal coupled between the X1/TDC and X2/MSI terminals, with the digital data word for the first channel being transmitted to the codec/filter 32' via the TX terminal in synchronization with a TE1 signal generated by the TX control 80 relative to the last valid sync signal, and the digital data word for the second data channel being transmitted to the data port 48 via the TX terminal in synchronization with a TE2 signal generated by the TX control 80 relative to the last valid sync signal.

Figure 8:
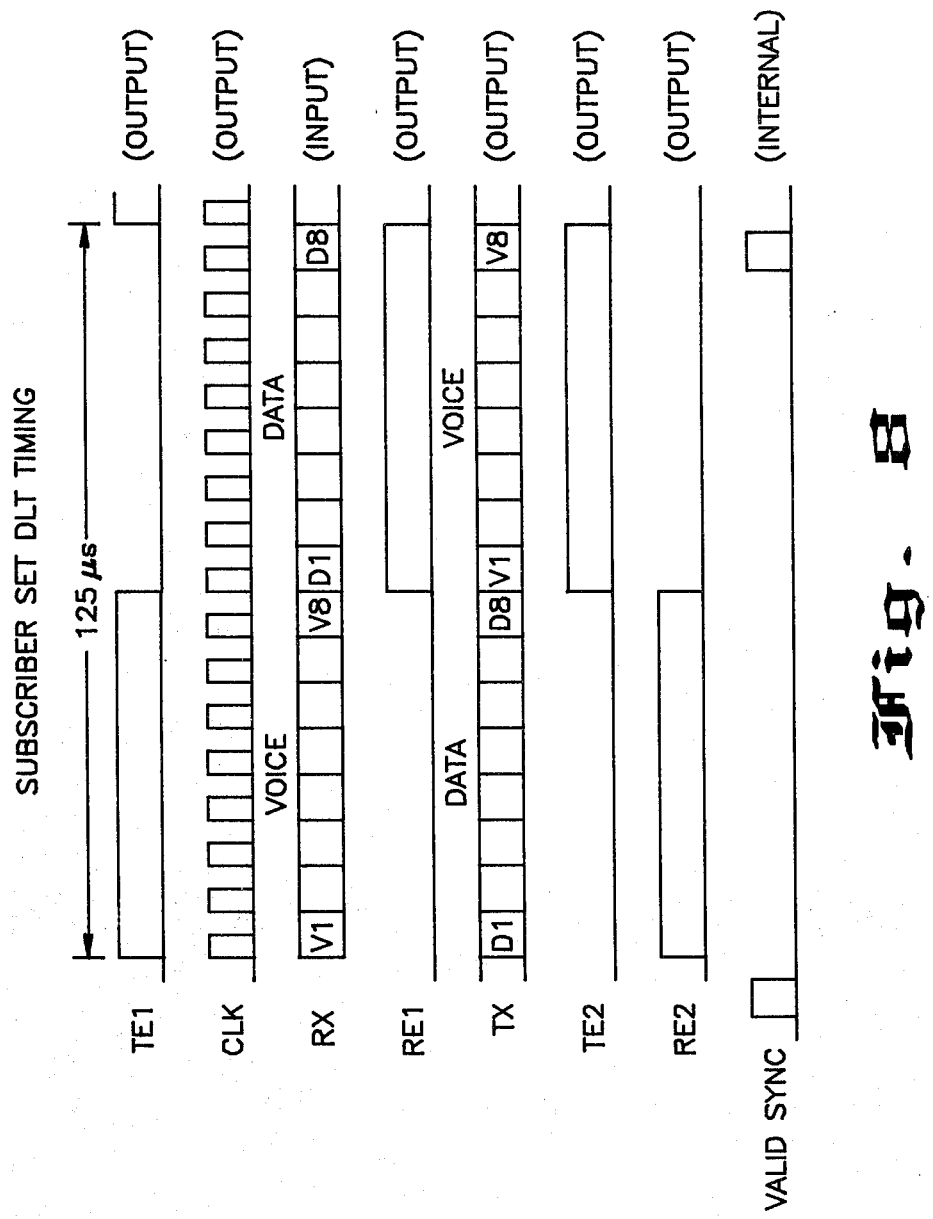
FIG. 8 is a timing diagram illustrating a typical exchange between the DLT in the subscriber set of FIG. 4 and the codec/filter therein.

In response to each of the valid sync signals provided by the sync detector 92, the RX register 72 successively receives a digital data word for each of the channels in synchronization with a receive data clock generated by the sequencer and control 68, with the digital PCM voice data word for the first channel being received from the codec/filter 32' via the RX terminal in synchronization with an RE1 signal generated by the RX control 70 relative to the last valid sync signal, and the digital data word for the second channel being received from the data port 48 via the RX terminal in response to an RE2 signal generated by the RX control 70 relative to the last valid sync signal. In response to the next valid sync signal provided by the sync detector 92, both digital data words are transferred to the XMIT register 74 and the then-current states of the respective channel signalling bits provided via the S1I and S2I terminals by the hook switch 58 and, if appropriate, the subscriber data processor, respectively, are added to complete the frame. As soon as the frame has been assembled, the DAC control circuit 82 actuates the DAC 84 to serially modulate the first and second digital data words and the respective channel signalling bits in the frame, for transmission via the transmit transformer 40' to the trasmit pair of wires in the subscriber line. A typical sequential interaction of the DLT 36' with the codec/filter 32' and the subscriber data processor is illustrated by way of example in the timing diagram of FIG. 8.

Although the DLT 36 is designed to operate primarily in the dual-channel mode over a duplex subscriber line, the DLT 36 may be operated in an exchange which has only one pair of wires in each subscriber line by applying a logic high to a format (FOR) terminal thereof. In the illustrated form of such a 2-wire system shown in FIG. 9, the half duplex subscriber line is coupled at the exchange end thereof to the DLT 36 in the digital line card 22' via a transmit/receive isolation transformer 106, and at the subscriber end thereof to the DLT 36' in the digital subscriber set 44 via a transmit/receive isolation transformer 106'. In the dual-channel form of the half duplex system, a frame of data comprises an 8-bit digital data word for the first channel, the signalling bit for the first channel, and a second signalling bit for use by the subscriber data processor as a digital data bit. Preferably, the frame also includes a parity bit, either even or odd, as desired. A suitable frame format is illustrated in FIG. 9. Since only a single digital data bit may be transferred in each frame, the effective data bit transmission rate is only 8 kHz rather than the 64 kHz of the duplex system. However, this reduced data rate may be acceptable in situations where the cost to install the second pair of wires in the subscriber line outweighs the benefits of higher transmission rate.

These and other changes and modifications may be made in the arrangement or construction of the various parts or elements of the preferred embodiments as disclosed herein without departing from the spirit and scope of the present invention as defined in the appended claims.

We claim:

1. A digital loop transceiver circuit for providing duplex communication of digital data words on first and second channels and a signalling bit associated with each of said first and second channels, between a duplex subscriber line and a digital I/O port, the transceiver circuit comprising:
    receiver means for successively receiving a first and a second of said digital data words and of said signalling bits in synchronization with a receive data clock, said first digital data word and the respective signalling bit being received from said digital I/O port in response to a first channel receive enable signal, and said second digital data word and the respective signalling bit being received from said digital I/O port in response to a second channel receive enable signal;
    modulation means for serially modulating said first and second digital data words and the respective signalling bits for transmission via a first portion of said subscriber line;
    sync detection means for detecting a modulated signal on a second portion of said subscriber line, and providing a valid sync signal in response to said detection;
    demodulation means for serially demodulating, in response to said valid sync signal, a third and a fourth of said digital data words and of said signalling bits received via said second portion of said subscriber line; and
    transmitter means for transmitting said third and fourth digital data words and the respective signalling bits in synchronization with a transmit data clock, said third digital data word being transmitted to said digital I/O port in response to a first channel transmit enable signal, and said fourth digital data word being transmitted to said digital data port in response to a second channel transmit enable signal.

2. A digital subscriber set having substantially independent voice and data channels, said digital subscriber set comprising:
    voice channel means for periodically providing a digital PCM voice input data word representing a digitized voice input signal, and for receiving a digital PCM voice output data word for output as a voice output signal;
    data channel means for receiving a digital information input data word provided to said digital subscriber set, and for transmitting from said digital subscriber set a received digital information input data word;
    signalling means for selectively generating call control signals, including a transmit channel signalling bit, for each of said voice and data channels, and for providing an output signal in response to receiving a predetermined receive channel signalling bit for each of said voice and data channels;
    subscriber line interface means for coupling said digital subscriber set to transmit and receive portions of a duplex subscriber line; and
    the digital loop transceiver means of claim 1 coupled between said subscriber line interface means and said voice channel means, said data channel means and said signalling means wherein said digital PCM voice input data word, said digital information input data word, said digital PCM voice output data word, and said digital information output data word comprise said first, second, third and fourth digital data words, respectively, wherein said transmit channel signalling bits comprise said first and second signalling bits, and wherein said receive channel signalling bits comprise said third and fourth signalling bits.

3. A telecommunication subscriber line interface circuit for coupling a digital switching system having a digital data bus and a control bus via a duplex subscriber line to a digital subscriber set having time multiplexed first and second digital data channels, the interface circuit comprising:
    time slot assignment and control means coupled to said control bus and responsive to control signals received therefrom and to first and second transmit channel signalling bits coupled thereto, for selectively providing first and second receive enable signals during respective first and second receive channel time slots, first and second transmit enable signals during respective first and second transmit channel time slots, and first and second receive channel signalling bits;
    subscriber line interface means for coupling said interface circuit to a transmit and a receive portion of said duplex subscriber line; and
    the digital loop transceiver means of claim 1 coupled between said subscriber line interface means and said data bus, and to said time slot assignment and control means, wherein said first and second transmit channel signalling bits comprise said first and second signalling bits and wherein said first and second receive channel signalling bits comprise said third and fourth signalling bits.

4. The digital loop transceiver circuit of claim 1 wherein said subscriber line comprises a pair of conductors, said first portion comprises said pair of conductors during a first period of time, and said second portion comprises said pair of conductors during a second period of time.

5. The digital loop transceiver circuit of claim 1 wherein said subscriber line comprises first and second pairs of conductors, said first portion comprises said first pair of conductors, and said second portion comprises said second pair of conductors.

6. A digital subscriber set having substantially independent voice and data channels, said digital subscriber set comprising:
- voice channel means for periodically providing a digital PCM voice input data word representing a digitized voice input signal, and for receiving a digital PCM voice output data word for output as a voice output signal;
- data channel means for receiving a digital information input data word provided to said digital subscriber set, and for transmitting from said digital subscriber set a received digital information input data word;
- signalling means for selectively generating call control signals, including a transmit channel signalling bit, for each of said voice and data channels, and for providing an output signal in response to receiving a predetermined receive channel signalling bit for each of said voice and data channels;
- subscriber line interface means for coupling said digital subscriber set to transmit and receive portions of a duplex subscriber line; and
- digital loop transceiver means coupled between said subscriber line interface means and said voice channel means, said data channel means and said signalling means, comprising:
  - sync detection means for detecting a modulated signal on said transmit portion of said subscriber line via said subscriber line interface means, providing a valid sync signal in response to the detection thereof, and providing first and second receive enable signals and first and second transmit enable signals in predetermined relationship to said detection;
  - demodulation means for serially demodulating, in response to said valid sync signal, a digital PCM voice input data word and a digital output data word and a receive channel signalling bit associated with each, received from said transmit portion of said subscriber line via said subscriber line interface means;
  - transmitter means for transmitting said digital PCM voice output data word and said digital information input data word and the respective receive channel signalling bits in synchronization with a data clock developed by said transmitter means, said digital PC voice output data word being transmitted to said voice channel means in response to said first transmit enable signal, said digital information input data word being transmitted to said data channel means in response to said second transmit enable signal, and said signalling bits being transmitted to said signalling means;
  - receiver means for successively receiving a digital PCM voice input data word and a digital information input data word and a transmit channel signalling bit associated with each, in synchronization with said data clock, said digital PCM voice input data word being received from said voice channel means in response to said first receive enable signal, said digital information input data word being received from said data channel means in response to said second receive enable signal, and said transmit channel signalling bits being received from said signalling means; and
  - modulation means for serially modulating said digital PCM voice input data word and said digital information input data word and the respective transmit channel signalling bits for transmission in response to said valid sync signal to said receive portion of said subscriber line via said subscriber line interface means.

7. A telecommunication subscriber line interface circuit for coupling a digital switching system having a digital data bus and a control bus via a duplex subscriber line to a digital subscriber set having time multiplexed first and second digital data channels, the interface circuit comprising:
- time slot assignment and control means coupled to said control bus and responsive to control signals received therefrom and to first and second transmit channel signalling bits coupled thereto, for selectively providing first and second receive enable signals during respective first and second receive channel time slots, first and second transmit enable signals during respective first and second transmit channel time slots, and first and second receive channel signalling bits;
- subscriber line interface means for coupling said interface circuit to a transmit and a receive portion of said duplex subscriber line; and
- digital loop transceiver means coupled between said subscriber line interface means and said data bus, and to said time slot assignment and control means, said transceiver comprising:
  - receiver means for successively receiving first and second digital data words and the receive channel signalling bit associated with each in synchronization with a receive data clock provided by said switching system, said first digital data word being received from said data bus in response to said first receive enable signal, said second digital data word being received from said data bus in response to said second receive enable signal, and said receive channel signalling bits being received from said time slot assignment and control means;
  - modulation means for serially modulating said first and second digital data words and the respective receive channel signalling bits for transmission, in response to a sync signal provided by said switching system, to said transmit portion of said subscriber line via said subscriber line interface means;
  - sync detection means for detecting a modulated signal on said receive portion of said subscriber line via said subscriber line interface means; and for providing a valid sync signal in response to the detection thereof;
  - demodulation means for serially demodulating, in response to said valid sync signal, third and fourth digital data words and a transmit channel signalling bit associated with each, received on said receive portion of said subscriber line via said subscriber line interface means; and
  - transmitter means for transmitting said third and fourth digital data words and the respective transmit channel signalling bits in synchronization with a transmit data clock provided by said switching system, said third digital data word being transmitted to said data bus in response to said first transmit enable signal, said second digital data word being transmitted to said data bus in response to said second transmit enable signal, and said transmit channel signalling bits being transmitted to said time slot assignment and control means.

8. A telecommunication subscriber line interface network comprising:
 a digital subscriber set having substantially independent voice and data channels, said digital subscriber set comprising:
  voice channel means for periodically providing a digital PCM voice input data word representing a digitized voice input signal, and for receiving a digital PCM voice output data word for output as a voice output signal;
  data channel means for receiving a digital information input data word provided to said digital subscriber set, and for transmitting from said digital subscriber set a received digital information output data word;
  signalling means for selectively generating call control signals, including a transmit channel signalling bit, for each of said voice and data channels, and for providing an output signal in response to receiving a predetermined receive channel signalling bit for each of said voice and data channels;
  subscriber line interface means for coupling said digital subscriber set to transmit and receive portions of a duplex subscriber line; and
  digital loop transceiver means coupled between said subscriber line interface means and said voice channel means, said data channel means and said signalling means, comprising:
   sync detection means for detecting a modulated signal on said transmit portion of said subscriber line via said subscriber line interface means, providing a valid sync signal in response to the detection thereof, and providing first and second receive enable signals and first and second transmit enable signals in predetermined relationship to said detection;
   demodulation means for serially demodulating, in response to said valid sync signal, said digital PCM voice output data word and said digital information output data word and a receive channel signalling bit associated with each, received from said transmit portion of said subscriber line via said subscriber line interface means;
   transmitter means for transmitting said digital PCM voice output data word and said digital information output data word and the respective receive channel signalling bits in synchronization with a data clock developed by said transmitter means, said digital PCM voice output data word being transmitted to said voice channel means in response to said first transmit enable signal, said digital information output data word being transmitted to said data channel means in response to said second transmit enable signal, and said signalling bits being transmitted to said signalling means;
   receiver means for successively receiving said digital PCM voice input data word and said digital information input data word and a transmit channel signalling bit associated with each, in synchronization with said data clock, said digital PCM voice input data word being received from said voice channel means in response to said first receive enable signal, said digital information input data word being received from said data channel means in response to said second receive enable signal, and said transmit channel signalling bits being received from said signalling means; and
   modulation means for serially modulating said digital PCM voice input data word and said digital information input data word and the respective transmit channel signalling bits for transmission in response to said valid sync signal to said receive portion of said subscriber line via said subscriber line interface means; and
 a telecommunication subscriber line interface circuit for coupling a digital switching system having a digital data bus and a control bus via said duplex subscriber line to said digital subscriber set, said interface circuit comprising:
  time slot assignment and control means coupled to said control bus and responsive to control signals received therefrom and to first and second transmit channel signalling bits coupled thereto, for selectively providing first and second receive enable signals during respective first and second receive channel time slots, first and second transmit enable signals during respective first and second transmit channel time slots, and first and second receive channel signalling bits;
  subscriber line interface means for coupling said interface circuit to a transmit and a receive portion of said duplex subscriber line; and
  digital loop transceiver means coupled between said subscriber line interface means and said data bus, and to said time slot assignment and control means, said transceiver comprising:
   receiver means for successively receiving first and second digital data words and the receive channel signalling bit associated with each in synchronization with a receive data clock provided by said switching system, said first digital data word being received from said data bus in response to said first receive enable signal, said second digital data word being received from said data bus in response to said second receive enable signal, and said receive channel signalling bits being received from said time slot assignment and control means;
   modulation means for serially modulating said first and second digital data words and the respective receive channel signalling bits for transmission, in response to a sync signal provided by said switching system, to said transmit portion of said subscriber line via said subscriber line interface means;
   sync detection means for detecting a modulated signal on said receive portion of said subscriber line via said subscriber line interface means, and for providing a valid sync signal in response to the detection thereof;
   demodulation means for serially demodulating, in response to said valid sync signal, third and fourth digital data words and a transmit channel signalling bit associated with each, received on said receive portion of said subscriber line via said subscriber line interface means; and transmitter means for transmitting said third and fourth digital data words and the respective transmit channel signalling bits in synchronization with a transmit data clock provided by said switching system, said third digital data word being transmitted to said data bus in respose to said first transmit enable signal, said second digital data word being transmitted to said data bus in response to said second transmit enable signal, and said transmit channel signalling bits being transmitted to said time slot assignment and control means.

9. A digital loop transceiver circuit for providing duplex communication of digital data words on first and second channels and a signalling bit associated with said first channel, between a duplex subscriber line and a digital I/O port, the transceiver circuit comprising:

receiver means for successively receiving a first and a second of said digital data words and a first of said signalling bits in synchronization with a receive data clock, said first and second digital data words and said first signalling bit being received from said digital I/O port in response to a channel receive enable signal;

modulation means for serially modulating said first and second digital data words and said signalling bit for transmission via a first portion of said subscriber line;

sync detection means for detecting a modulated signal on a second portion of said subscriber line, and providing a valid sync signal in response to said detection;

demodulation means for serially demodulating, in response to said valid sync signal, a third and a fourth of said digital data words and a second of said signalling bits received via said second portion of said subscriber line; and transmitter means for transmitting said third and fourth digital data words and said second signalling bit in synchronization with a transmit data clock, said third and fourth digital data words being transmitted to said digital I/O port in response to a first channel transmit enable signal.

10. The digital loop transceiver circuit of claim 9 wherein said subscriber line comprises a pair of conductors, said first portion comprises said pair of conductors during a first period of time, and said second portion comprises said pair of conductors during a second period of time.

11. The digital loop transceiver circuit of claim 9 herein said subscriber line comprises first and second pairs of conductors, said first portion comprises said first pair of conductors, and said second portion comprises said second pair of conductors.

12. A digital subscriber set having substantially independent voice and data channels, said digital subscriber set comprising:

voice channel means for periodically providing a digital PCM voice input data word representing a digitized voice input signal, and for receiving a digital PCM voice output data word for output as a voice output signal;

data channel means for receiving a digital information input data word provided to said digital subscriber set, and for transmitting from said digital subscriber set a received digital information output data word;

signalling means for selectively generating a call control signal, including a transmit channel signalling bit, for said voice channel, and for providing an output signal in response to receiving a predetermined receive channel signalling bit for said voice channel;

subscriber line interface means for coupling said digital subscriber set to transmit and receive portions of a duplex subscriber line; and the digital loop transceiver means of claim 9 coupled between said subscriber line interface means and said voice channel means, said data channel means and said signalling means, wherein said digital PCM voice input data word, said digital information input data word, said digital PCM voice output data word, and said digital information output data word comprise said first, second, third and fourth digital data words, respectively, wherein said transmit channel signalling bit comprises said first signalling bit, and wherein said receive channel signalling bit comprises said second signalling bit.

13. A telecommunication subscriber line interface circuit for couling a digital switching system having a digital data bus and a control bus via a duplex subscriber line to a digital subscriber set having time multiplexed first and second digital data channels, the interface circuit comprising:

time slot assignment and control means coupled to said control bus and responsive to control signals received therefrom and to a transmit channel signalling bit coupled thereto, for selectively providing a receive enable signal during a receive channel time slot, a transmit enable signal during a transmit channel time slot, and a receive channel signalling bit;

subscriber line interface means for coupling said interface circuit to a transmit and a receive portion of said duplex subscriber line; and the digital loop transceiver means of claim 9 coupled between said subscriber line interface means and said data bus, and to said time slot assignment and control means, wherein said transmit channel signalling bit comprises said first signalling bit, and wherein said receive channel signalling bit comprises said second signalling bit.

14. A digital loop transceiver circuit for providing duplex communication of digital data words on a channel and a signalling bit associated with said channel, between a duplex subscriber line and a digital I/O port, the transceiver circuit comprising:

receiver means for successively receiving a first of said digital data words and a first of said signalling bits in synchronization with a receive data clock, said first digital data word and said first signalling bit being received from said digital I/O port in response to a channel receive enable signal;

modulation means for serially modulating said first digital data word and said first signalling bit for transmission via a first portion of said subscriber line;

sync detection means for detecting a modulated signal on a second portion of said subscriber line, and providing a valid sync signal in response to said detection;

demodulation means for serially demodulating, in response to said valid sync signal, a second of said digital data words and a second of said signalling bits received via said second portion of said subscriber line; and transmitter means for transmitting said second digital data word and said second signalling bit in synchronization with a transmit data clock, said second digital data word being transmitted to said digital I/O port in response to a channel transmit enable signal.

15. The digital loop transceiver circuit of claim 14 wherein said subscriber line comprises a pair of conductors, said first portion comprises said pair of conductors during a first period of time, and said second portion comprises said pair of conductors during a second period of time.

16. The digital loop transceiver circuit of claim 14 wherein said subscriber line comprises first and second pairs of conductors, said first portion comprises said first pair of conductors, and said second portion comprises said second pair of conductors.

17. A digital subscriber set comprising:

voice channel means for periodically providing a digital PCM voice input data word representing a digitized voice input signal, and for receiving a digital PCM voice output data word for output as a voice output signal;

signalling means for selectively generating a call control signal, including a transmit channel signalling bit, for said voice channel and for providing an output signal in response to receiving a predetermined receive channel signalling bit for said voice channel;

subscriber line interface means for coupling said digital subscriber set to transmit and receive portions of a duplex subscriber line; and the digital loop transceiver means of claim 14 coupled between said subscriber line interface means and said voice channel means, wherein said digital PCM voice input data word and said digital PCM voice output data word comprise said first and second digital data words, respectively, wherein said transmit channel signalling bit comprises said first signalling bit, and wherein said receive channel signalling bit comprises said second signalling bit.

18. A telecommunication subscriber line interface circuit for coupling a digital switching system having a digital data bus and a control bus via a duplex subscriber line to a digital subscriber set, the interface circuit comprising:

time slot assignment and control means coupled to said control bus and responsive to control signals received therefrom and to a transmit channel signalling bit coupled thereto, for selectively providing a receive enable signal during a receive channel time slot, a transmit enable signal during a transmit channel time slot, and a receive channel signalling bit;

subscriber line interface means for coupling said interface circuit to a transmit and a receive portion of said duplex subscriber line; and the digital loop transceiver means of claim 14 coupled between said subscriber line interface means and said data bus, and to said time slot assignment and control means, wherein said transmit channel signalling bit comprises said first signalling bit, and wherein said receive channel signalling bit comprises said second signalling bit.

* * * * *

UNITED STATES PATENT AND TRADEMARK OFFICE
CERTIFICATE OF CORRECTION

PATENT NO. : 4,432,089
DATED : February 14, 1984
INVENTOR(S) : Wurzburg et. al.

It is certified that error appears in the above-identified patent and that said Letters Patent is hereby corrected as shown below:

In claim 6, line 52, change "PC to --PCM--.

Signed and Sealed this

First Day of January 1985

[SEAL]

Attest:

GERALD J. MOSSINGHOFF

Attesting Officer

Commissioner of Patents and Trademarks